(12) United States Patent
Disatnik et al.

(10) Patent No.: US 11,683,784 B2
(45) Date of Patent: Jun. 20, 2023

(54) AUTOMATICALLY DETERMINING LOCATIONS OF SIGNAL SOURCES IN AREAS WITH LIMITED SATELLITE COVERAGE

(71) Applicant: GOOGLE LLC, Mountain View, CA (US)

(72) Inventors: Gil Disatnik, Kibbutz Yakum (IL); Sagi Hed, Ramat Gan (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/938,043

(22) Filed: Oct. 4, 2022

(65) Prior Publication Data

US 2023/0027869 A1 Jan. 26, 2023

Related U.S. Application Data

(63) Continuation of application No. 15/211,999, filed on Jul. 15, 2016, now Pat. No. 11,463,983.

(Continued)

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0242* (2013.01); *G01S 5/0252* (2013.01);
(Continued)

(58) Field of Classification Search
CPC . H04W 64/006; H04W 64/003; H04W 84/12; G01S 5/0242; G01S 5/0252;
(Continued)

(56) References Cited

U.S. PATENT DOCUMENTS

2009/0005972 A1  1/2009  de Koning
2011/0117924 A1  5/2011  Brunner et al.
(Continued)

FOREIGN PATENT DOCUMENTS

CN    1788211 A    6/2006
CN  102483451 A    5/2012
(Continued)

OTHER PUBLICATIONS

International Search Report and Written Opinion for Application No. PCT/US2017/014882, dated Jun. 19, 2017.
(Continued)

*Primary Examiner* — Marcos L Torres
(74) *Attorney, Agent, or Firm* — Marshall, Gerstein & Borun LLP

(57) ABSTRACT

To automatically determine geographic positions of signal sources in areas with limited satellite coverage, a system receives signal data collected by a receiver moving along a path through a geographic area with limited satellite coverage, the signal data being indicative of changes, over a period of time, in strength of respective signals detected by the moving receiver and emitted by multiple signal sources statically disposed along the path. The system determines a time it takes for a length of a vehicle to pass by the signal source at the determined speed. The system then calculates static positions of the signal sources using the signal data and the determined time, including associating the location of each signal source with a time when the signal source was directly over the roof of the vehicle in which the moving receiver is travelling.

10 Claims, 11 Drawing Sheets

Related U.S. Application Data

(60) Provisional application No. 62/286,804, filed on Jan. 25, 2016.

(51) Int. Cl.
*G01S 5/14* (2006.01)
*H04B 7/185* (2006.01)
*H04W 84/12* (2009.01)

(52) U.S. Cl.
CPC ............ *G01S 5/02521* (2020.05); *G01S 5/14* (2013.01); *H04B 7/18515* (2013.01); *H04B 7/18554* (2013.01); *H04W 64/003* (2013.01); *H04W 84/12* (2013.01)

(58) Field of Classification Search
CPC ... G01S 5/02521; G01S 5/14; H04B 7/18515; H04B 7/18554
See application file for complete search history.

(56) References Cited

U.S. PATENT DOCUMENTS

| | | |
|---|---|---|
| 2011/0199916 A1 | 8/2011 | Garrett et al. |
| 2012/0133555 A1 | 5/2012 | Hyun |
| 2013/0010597 A1 | 1/2013 | Liu et al. |
| 2013/0028245 A1 | 1/2013 | Oerton et al. |
| 2013/0308618 A1 | 11/2013 | Panneerselvam |
| 2013/0310067 A1* | 11/2013 | Nakata .................. G01S 13/931 455/456.1 |
| 2014/0050210 A1 | 2/2014 | Waters et al. |
| 2014/0266873 A1 | 9/2014 | Pighin et al. |
| 2015/0080013 A1 | 3/2015 | Venkatraman et al. |
| 2015/0094085 A1* | 4/2015 | Agrawal .............. A01K 1/0114 455/456.1 |
| 2015/0351070 A1 | 12/2015 | Lee et al. |
| 2015/0358936 A1 | 12/2015 | Kao et al. |
| 2016/0231426 A1 | 8/2016 | Smith et al. |
| 2016/0334494 A1 | 11/2016 | Yamauchi |

FOREIGN PATENT DOCUMENTS

| | | |
|---|---|---|
| CN | 102713663 A | 10/2012 |
| CN | 104322119 A | 1/2015 |

OTHER PUBLICATIONS

International Preliminary Report on Patentability for Application No. PCT/US2017/014882, dated Apr. 26, 2018.
Examination Report for European Application No. 17703596.1, dated Nov. 17, 2020.
First Examination Report for India Application No. 201847028460, dated Jan. 30, 2021.
Office Action and Search Report for Chinese Patent Application No. 201780019655.5, dated Mar. 17, 2023.

* cited by examiner

AUTOMATICALLY DETERMINING LOCATIONS OF SIGNAL SOURCES IN AREAS WITH LIMITED SATELLITE COVERAGE

CROSS-REFERENCE TO RELATED APPLICATION

The present application claims the benefit of priority under 35 U.S.C. § 120 as a continuation of U.S. patent application Ser. No. 15/211,999, filed Jul. 15, 2016, which claims the benefit of priority under 35 U.S.C. § 119 from U.S. Provisional Patent Application No. 62/286,804, filed Jan. 25, 2016, the disclosures of each which are hereby incorporated by reference in its entirety for all purposes.

FIELD OF THE DISCLOSURE

The present disclosure relates to automatic provisioning of wireless signal sources for subsequent use in geopositioning in areas with poor satellite coverage.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigation software available today cannot provide precise reliable navigation inside tunnels. More generally, geopositioning systems that rely on signals from satellites, such Global Positioning Service (GPS), do not work in areas where these signals are completely or substantially occluded by obstacles. Some devices in these situations rely on dead reckoning, or estimation of a change in position based on the speed at which the device is moving. However, dead reckoning accumulates errors, and accuracy quickly diminishes with changes in speed.

Meanwhile, navigation in tunnels remains a relevant problem as drivers often slow down and sometimes even come to a complete stop when checking for underground exits or turns. Especially as more and more drivers today become dependent on navigation systems telling them where and when they should turn, reliable geopositioning everywhere along a route, including inside tunnels, is important.

To use low-energy signal sources such as Bluetooth® or Wifi™ "beacons," or Wifi™ access points, for geopositioning in areas with limited satellite coverage, the locations of the signal sources must be established prior to geopositioning receivers. Determining locations of signal sources can require land surveying, precise measurements, precise installation, etc. For example, to install signal sources at precisely known locations (or precisely determining the locations immediately upon installation) in general is difficult, time-consuming, and potentially disruptive of the operation of the tunnel.

SUMMARY

Using the techniques of this disclosure, a system automatically determines the locations of signal sources disposed in an area with limited satellite coverage, using signal data collected by receivers moving through the area. The signal data can include indications of how the strength of signals from several signal sources changes over time, and the system can identify observed or extrapolated peak values within the data to determine relative positioning of the signal sources. The system also can utilize known or conventionally determinable positions of signal sources located near the boundaries of the area with limited satellite coverage, e.g., the GPS coordinates of a signal source located just outside the entrance into a tunnel and the GPS coordinates of another signal source located outside the exit out of the tunnel. As discussed below, the techniques the system implements can include determining variations in speed of the receiver moving through the area, averaging of signal data from multiple receivers, profiling individual signal sources, etc.

According to another implementation, the system uses round trip-time (RTT) measurements which the signal sources collect when exchanging management frames. The system may use these measurements along with a description of the geometry of the path along which receivers move through the area with limited satellite coverage. In some cases, the system does not rely on the description of geometry and determines the locations of signal sources using multiple RTT measurements.

One particular embodiment of these techniques is a method for automatically determining geographic positions of signal sources in areas with limited satellite coverage. The method includes receiving, by one or more processors, signal data collected by a receiver moving along a path through a geographic area with limited satellite coverage, the signal data being indicative of changes, over a period of time, in strength of respective signals emitted by multiple signal sources statically disposed along the path. The method further includes receiving, by the one or more processors, indications of a first position of the receiver at a first time prior to entering the geographic area and a second position of the receiver at a second time subsequent to leaving the geographic area. Further, the method includes determining, by the one or more processors, positions for the signal sources using the received signal data and the received indications of the positions and the times and using the determined positions for the signal sources to geoposition a device moving along the path.

Another embodiment of these techniques is a system for geopositioning receivers in areas with areas with limited satellite coverage. The system includes one or more processors and a non-transitory computer-readable memory coupled to the one or more processor. The memory stores instructions that, when executed by the one or more processors, cause the system to implement the method outlined above.

Yet another embodiment is a method for automatically provisioning signal sources for operating in a geopositioning system. The method includes obtaining an indication of geometry along which signal sources are disposed, where the geometry describes a region of physical space. The method further includes receiving, from the signal sources, signal data indicative of distances between at least several of the signal sources, where the signal data is generated by the signal sources transmitting management frames. The method also includes determining, using the indication of the geometry and the received signal data, positions of the signal sources along the geometry, and using the determined positions of the signal sources to geoposition portable computing devices travelling through the region physical space.

DETAILED DESCRIPTION

As briefly outlined above, a system that implements the techniques of this disclosure automatically determines how proximity beacons or other signal sources are arranged along a path through an area with limited satellite coverage, using signal data collected by one or multiple receivers (such as smartphones) moving through the area. The system also can utilize other input to makes the determination more accurate, depending on the implementation. Once the locations of the beacons have been determined, the system can geoposition receivers subsequently moving the area along the path, or the beacons can transmit the determined location information in management frames and/or advertisement transmissions to allow receivers to geoposition themselves autonomously.

The techniques of this disclosure can reduce the amount of time required to provision beacons or other signal sources for geopositioning as well as eliminate the need for operators to obtain and manually enter location information into the beacons and/or a centralized database.

Figure 1:
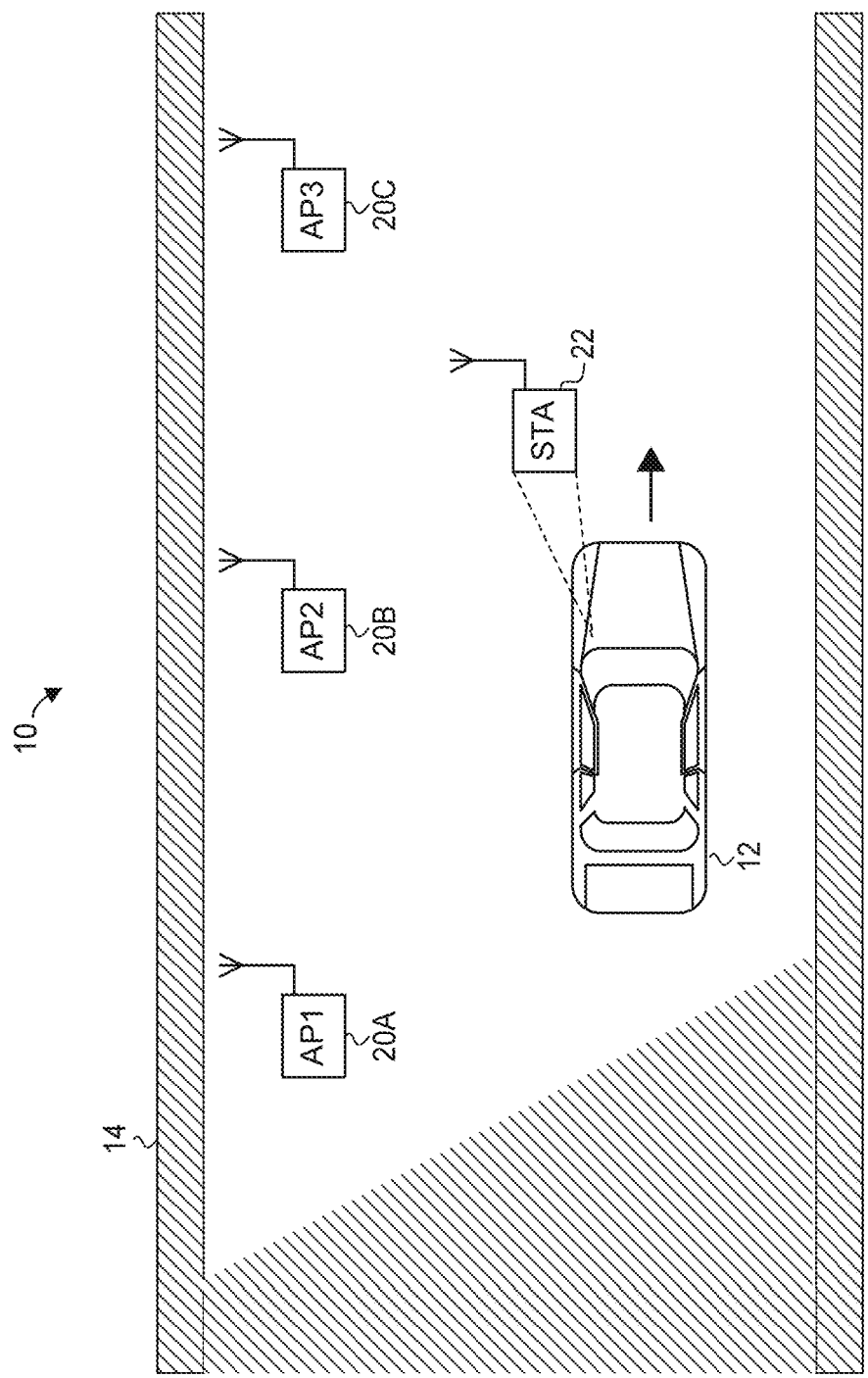
FIG. 1 is a diagram of an example environment in which a mobile device moving through an area of limited satellite signal coverage determines its current location using signals from several signal sources configured using the techniques of this disclosure.
Figure 2:
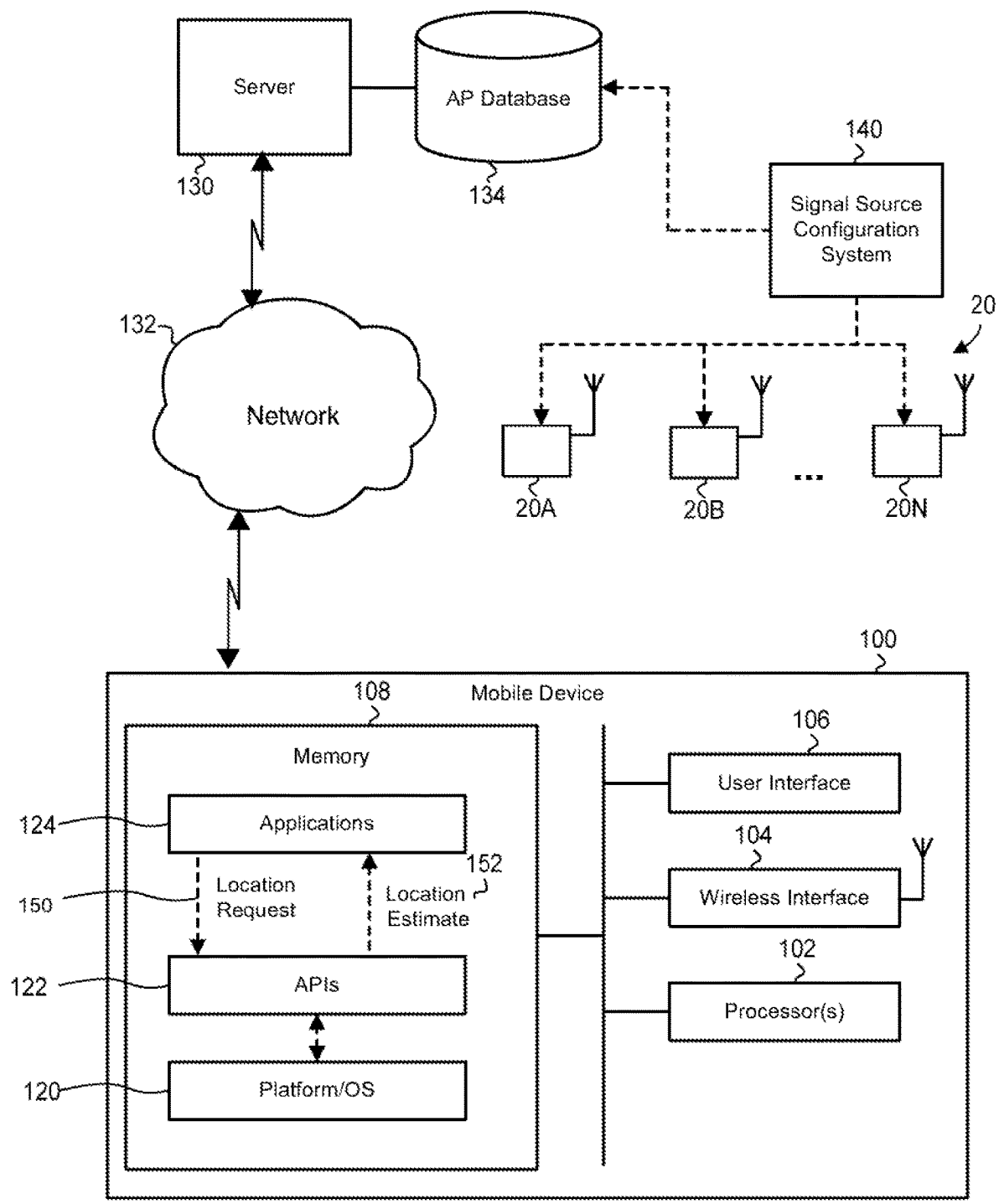
FIG. 2 is a block diagram of an example computing system that can be implemented in the environment of FIG. 1.

An example environment in which these techniques can be used and a system that can operate in this environment are discussed first with reference to FIGS. 1 and 2. For further clarity, example geopositioning techniques using signal sources operating in this environment are discussed with reference to the flow diagrams of FIGS. 3 and 4. In some embodiments, the system of FIG. 3 uses these geopositioning techniques after the locations of the signal sources are automatically determined using one or several of the approaches discussed with reference to FIGS. 5-12.

Example Environment and System Components

FIG. 1 schematically illustrates an example environment 10 in which a vehicle 12 moves through a region in which little or no satellite signal coverage is available due to obstacles 14 that substantially block radio signals. For example, the obstacles 14 can the walls and the ceiling of a tunnel. Signal sources 20 are disposed along the direction in which vehicles move through the tunnel and are configured to transmit management frames such as beacons. The signal sources 20 can be proximity beacons that operate according to Bluetooth® or Wifi™ standards, for example, or wireless access points via which devices can access a communication network. The signal sources 20 may include one or more processors and a non-transitory memory storing instructions that can be executed on the one or more processors. The vehicle 12 is equipped with a wireless receiver or transceiver 22 that operates as a wireless client or "station" when interacting with the signal sources 20. None of the components in FIG. 1 or distances between these components are drawn to scale.

In operation, the signal sources 20 transmit management frames in a manner that, on the one hand, allows multiple signal sources to co-exist on the same channel and, on the other hand, allows the station 22 to receive management frames from several different access points substantially at the same time, i.e., within a time interval during which the vehicle 12, even when moving at 100 km/h, travels no more than several meters. The term "channel" in this disclosure should be understood to include a frequency/frequency band, or another suitable form of partitioning a radio resource for concurrent use by multiple transmitters. As discussed in more detail below, the signal sources 20 to this end are configured to transmit management frames on a same channel using a suitable modulation scheme.

The station 22 can be a navigation system built into the vehicle 12, a portable navigation device, a smartphone with navigation software, a wearable device such as a smartwatch, etc. Further, although FIG. 1 illustrates a personal vehicle, in other environments the station 22 can operate in trains, busses, and other types of vehicles.

The station 22 can be implemented in a mobile device 100 illustrated in FIG. 2. The mobile device 100 can include one or more processor(s) 102 such as CPUs, for example, a wireless interface 104 such as a wireless card that supports communications using communication protocols that conform to such standards as IEEE 802.11 (Wi-Fi) and/or 802.15 (Bluetooth), for example, a user interface 106 such as touchscreen, a speaker, etc., and a non-transitory computer-readable memory 108, which can include persistent and/or non-persistent storage components.

In an example implementation, the memory 108 stores a software platform 120, which can include an operating system (e.g., Android®, iOS®), additional libraries, plug-ins, various porting layers, etc. Applications 124 can access various functions of the platform 120 via an API layer 122. For example, the platform 120 can include functionality for determining the location of the mobile device 100 using available signals, such as GPS signals, Wi-Fi signals, etc., and exposed some of the results of geopositioning via an API. More specific examples of such functionality include Fused Location Provider (FLP) available on Android® operating system and Location Services (LS) available on iOS®.

With continued reference to FIG. 2, the mobile device 100 normally can access a network server 130 via a wireless network 132. The network server 130 can retrieve data related to the signal sources 20 from an access point database 134 and provide this data to the mobile device 100. The access point database 134 can be implemented in one or more servers in any suitable manner. The data can include identifiers of access points, channel selection, geographic locations of the access points, etc. Using this data and signal strength measurements (or other suitable measurements) of management frames from the signal sources 20, the mobile device 100 can determines its current location. When in a tunnel, the mobile device 100 may not be able to access the server 130, and in some implementations may rely on pre-cached data related to the signal sources 20. A signal source configuration system 140 can configure the signal sources 20 as discussed below and populate the corresponding data records in the database 134.

As also discussed below, one or more receivers such as smartphones can participate in collection of signal data from the signal sources 20A-C and providing the signal data to the source configuration system 140, which then automatically determines the locations of the signal sources 20A-C using this data. In some implementations, the user of a smartphone that participates in the determination of signal source locations operates certain controls and/or installs certain applications to allow the smartphone to report the measurements to the signal source configuration system 140.

Geopositioning Using Access Point Signals

Examples of functionality for determining the location of the mobile device 100 using available signals include Fused Location Provider (FLP) available on Android® operating system and Location Services (LS) available on iOS®. Both FLP and LS can activate Wi-Fi navigation in response to determining that the GPS signal is not available. However, the existing platforms generally provide only limited access to signal data and allow little, if any control, over processing signals from the signal sources 20. In particular, the existing platforms do not provide control to applications (such as the applications 124) over the order in which wireless channels are scanned, nor do these platforms provide an indication of the scan order or control over scanned channels.

On the platform 120 and other platforms available today, the scanning interval is approximately five seconds, with each scan taking up to 2.5 seconds. During a scan, the platform 120 iterates through a set of channels (e.g., 13 on a Wi-Fi network) to detect management frames and calculates Received Signal Strength Indication (RSSI) or another quantitative metric of signal quality for management frames from the signal sources 20A. When the platform receives the first management frame from the signal source 20A at the beginning of the 2.5-second scan on the first channel and receives the last management frame from the signal source 20B at the end of the 2.5-second scan on the last channel, the mobile device 100 can be displaced by a significant distance during this interval. For example, if the mobile device 100 operates in a vehicle travelling at 100 km/h, the first management frame and the last frame can be received and measured at locations that are approximately 70 meters apart.

As a result, when one of the applications 124 initiates a location request 150 via the API layer 122, the platform 120 can provide a location estimate 152 in which possible displacement of the mobile device during a scan introduces a significant error.

In one possible embodiment, the platform 120 exposes the scan order via the API layer 122, so that an application can retrieve an estimate of the speed of the mobile device 100 during a scan (using dead reckoning techniques, for example), determine when exactly management frames from particular access points were received within the scan period, and attempt to mitigate the error in view of the speed. Alternatively, error mitigation using dead reckoning could be implemented in the platform 120, so that the accuracy of the location estimate 152 returned via the API layer 122 is improved.

However, as discussed above, dead reckoning techniques are subject to error accumulation. Moreover, even if a certain platform is modified to provide an indication of scan order or exposes additional controls for controlling the scan order, it is desirable to have geopositioning solutions that do not depend on specific types or version of platform software.

To provide a solution that does not require installing specialized software on or otherwise reconfiguring the mobile device 100, the signal source configuration system 140 configures the signal sources 20A, 20B, . . . 20N to transmit Wi-Fi management frames on the same single channel. As a result, the platform 20 receives the Wi-Fi management frames from the signal sources 20A, 20B, . . . 20N and calculates the RSSI for these frames at approximately the same time, i.e., during the scan of the same channel during a multi-channel scan procedure. Even though the time the Wi-Fi management frames are received and measured and the time of the scan reported by the platform 120 can be separated by as much as 2.5 seconds, the overall precision of geopositioning increases because the measurements from multiple access points are collected at approximately the same time.

Further, the signal source configuration system 140 modifies the rate at which the signal sources 20 transmit management frames to address potential overcrowding of the shared channel. According to the existing standard, management frames are transmitted using Direct Sequence (DS) modulation, at 1 mbps. As a result, it takes approximately 2.5 ms to send each beacon, or 25 ms out of each second of required air time for every access point. This correspond to 1/40 the total air time, which makes the spectrum very crowded once multiple access points are added to the system 10. Both management frames and beacons adhere to the CSMA protocol. Assuming for example 42 access points transmitting, with 20 being "visible," the chances of finding an available timeslot are very small.

The avoid overcrowding for the reasons discussed above, the signal source configuration system 140 according to one example implementation configures the signal sources 20 to transmit management frames using Orthogonal Frequency Division Multiplexing (OFDM), so as to reach the speed of 54 mpbs. Experiments with 42 access points have shown that the air time required for each beacon/probe response was reduced to approximately 0.15 ms. The approximate probability of finding an available transmission slot, assuming all 42 access points are "visible," is approximately 93%.

Referring to FIGS. 1 and 2, experiments have been conducted to place the access points similar to the signal sources 20 in a tunnel, once every 40 m. The access points were installed on the side of the tunnel at the height of approximately 4 m. TL-WR740N devices, with the Atheros AR9x chipset, were used as access points. The access points were configured using OpenWRT firmware (it is noted that OpenWRT can be used with a variety of suitable access points, from various manufacturers). The experiments have shown that, even with multipath and poor line-of-sight factors, a receiver "sees" between −46 and −66 dBm when positioned between two adjacent access points, and between −32 and −52 dBm when at the shortest distance from one of the access points (with the other two access points corresponding to the signal strength of approximately −52 to −72 dBm, when the transmit power is set to +20 dBm. By simply averaging the RSSI, the geopositioning error was reduced to less than 16 m. Moreover, with Bluetooth transmitters, the error was reduced to less than 10 m, Thus, access points of this disclosure are placed in a tunnel and configured to transmit beacons or other management frames in a manner that allows a mobile device moving through the tunnel to determine its geographic position with sufficient accuracy. As discussed above, access points are configured to (i) transmit management frames on the same communication channel so as to eliminate the need for the mobile device to switch between channels when scanning for management frames, and (ii) transmit management frames using a modulation scheme (e.g., OFDM) that allows all the management frames to be collected within a short time interval (e.g., 15 ms) within which the vehicle has not moved far enough to significantly impact positioning accuracy.

Example Geopositioning Methods

Figure 3:
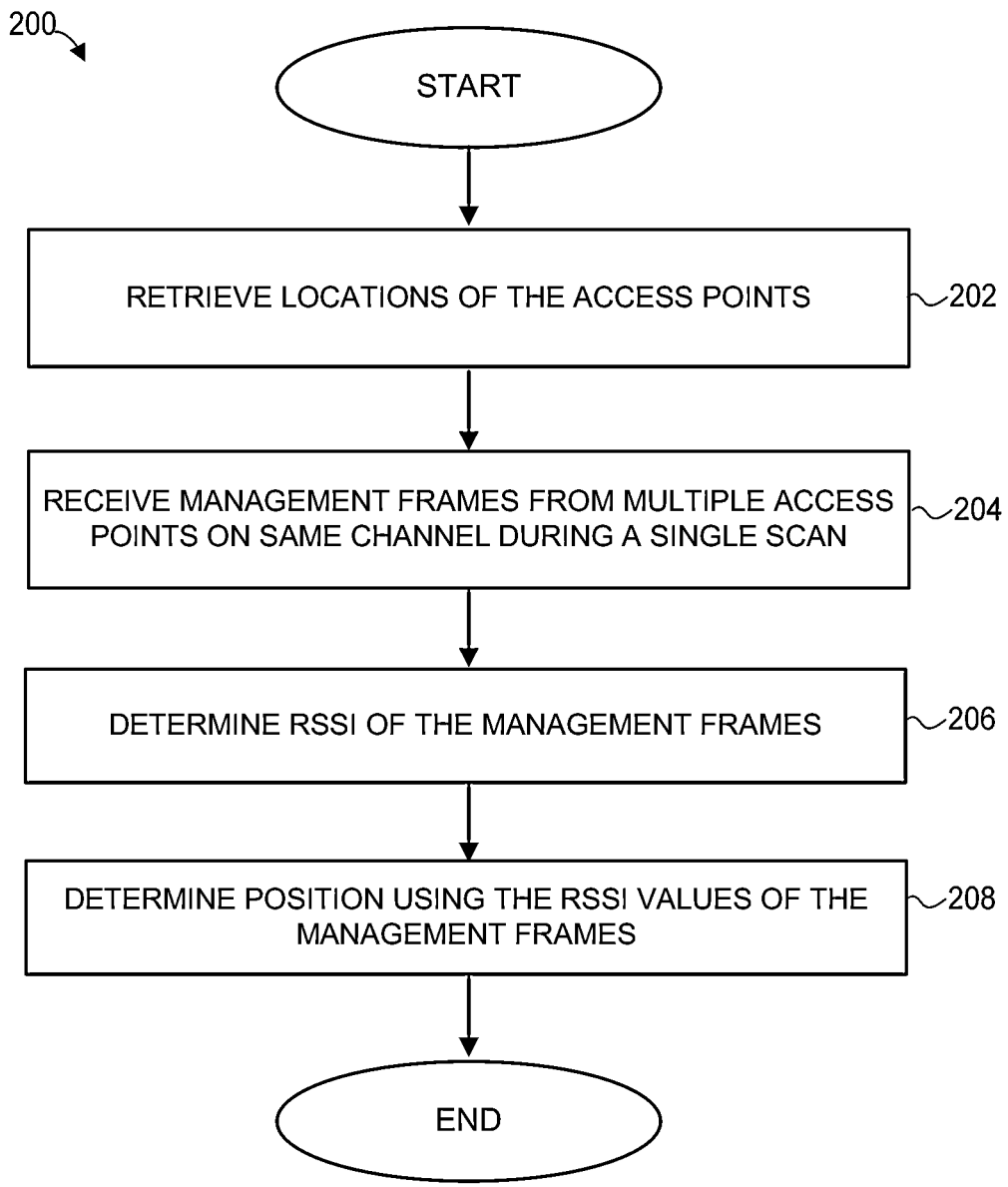
FIG. 3 is a flow diagram of an example method for geopositioning a mobile device that can operate in the system of FIG. 2.

For further clarity, FIG. 3 depicts a flow diagram of an example method 200 for geopositioning a mobile device. The method can be implemented in the mobile device 100 of FIG. 2 or the station 22 of FIG. 1, for example. Although the method 200 is discussed with reference to access points, it will be understood that these techniques can be used with any suitable signal sources, as indicated above.

The method 200 begins at block 202, where locations of a set of access points are retrieved. The access points may define a set sufficient for geopositioning a mobile device in a tunnel, for example. Depending on the implementation, the locations of the access points can be retrieved prior to the mobile device entering the tunnel or as the mobile device is travelling through the tunnel when cellular coverage is available, for example.

At block 204, management frames are received at the mobile device from multiple access points on the same channel during a single scan, and the RSSI of the management frames (or another suitable metric) is calculated at block 206. The mobile device then can determine its geographic position using the RSS values of the management frames and the previously received locations of the access points.

Figure 4:
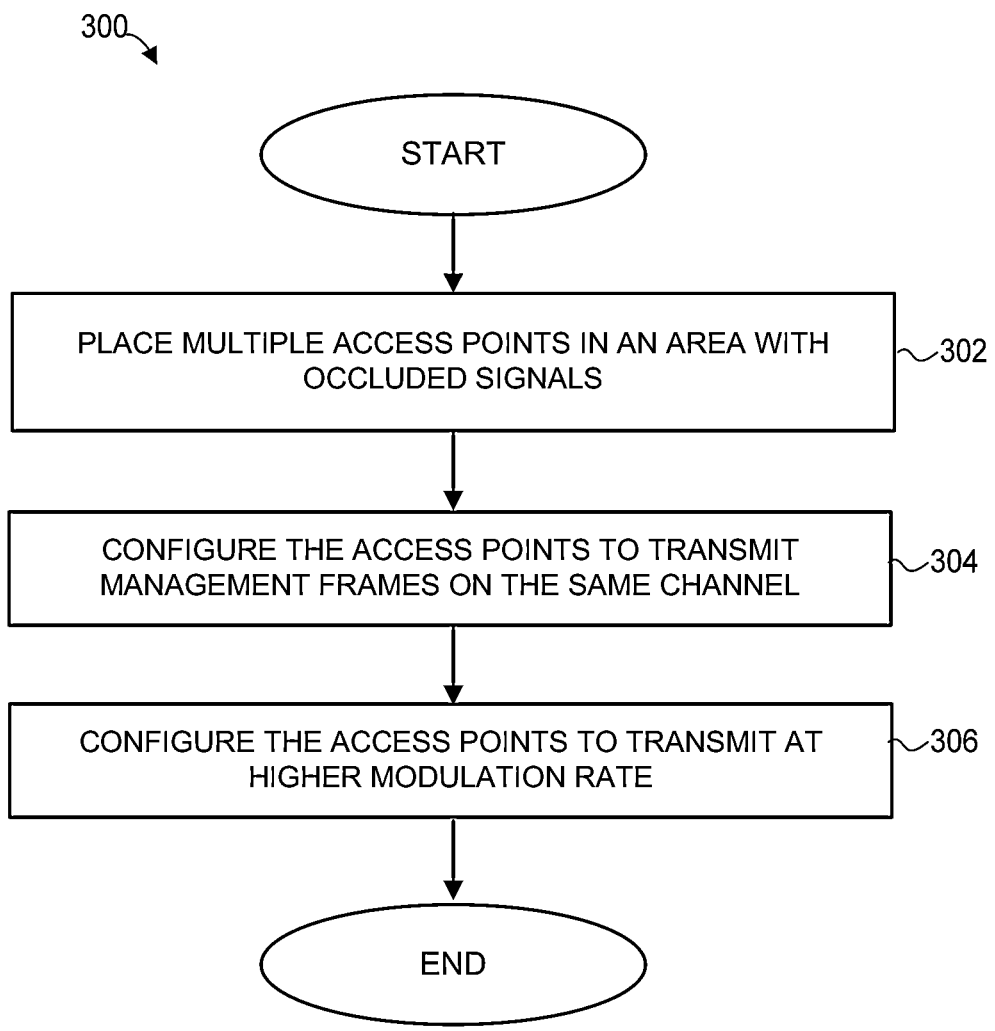
FIG. 4 is a flow diagram of an example method for configuring signal sources that can operate in the system of FIG. 2.

FIG. 4 depicts a flow diagram of an example method 200 for configuring access points. The method 200 can be implemented in the signal source configuration system 140, for example.

At block 302, multiple access points are placed in an area with occluded satellite signals, such as along a wall of a tunnel. The access points then are configured to transmit management frames on the same channel (block 304). At block 306, the access points are configured to transmit at a relatively high modulation rate, such as 542 mbps, using OFDM for example.

Automatically Determining Locations of Signal Sources

Figure 5:
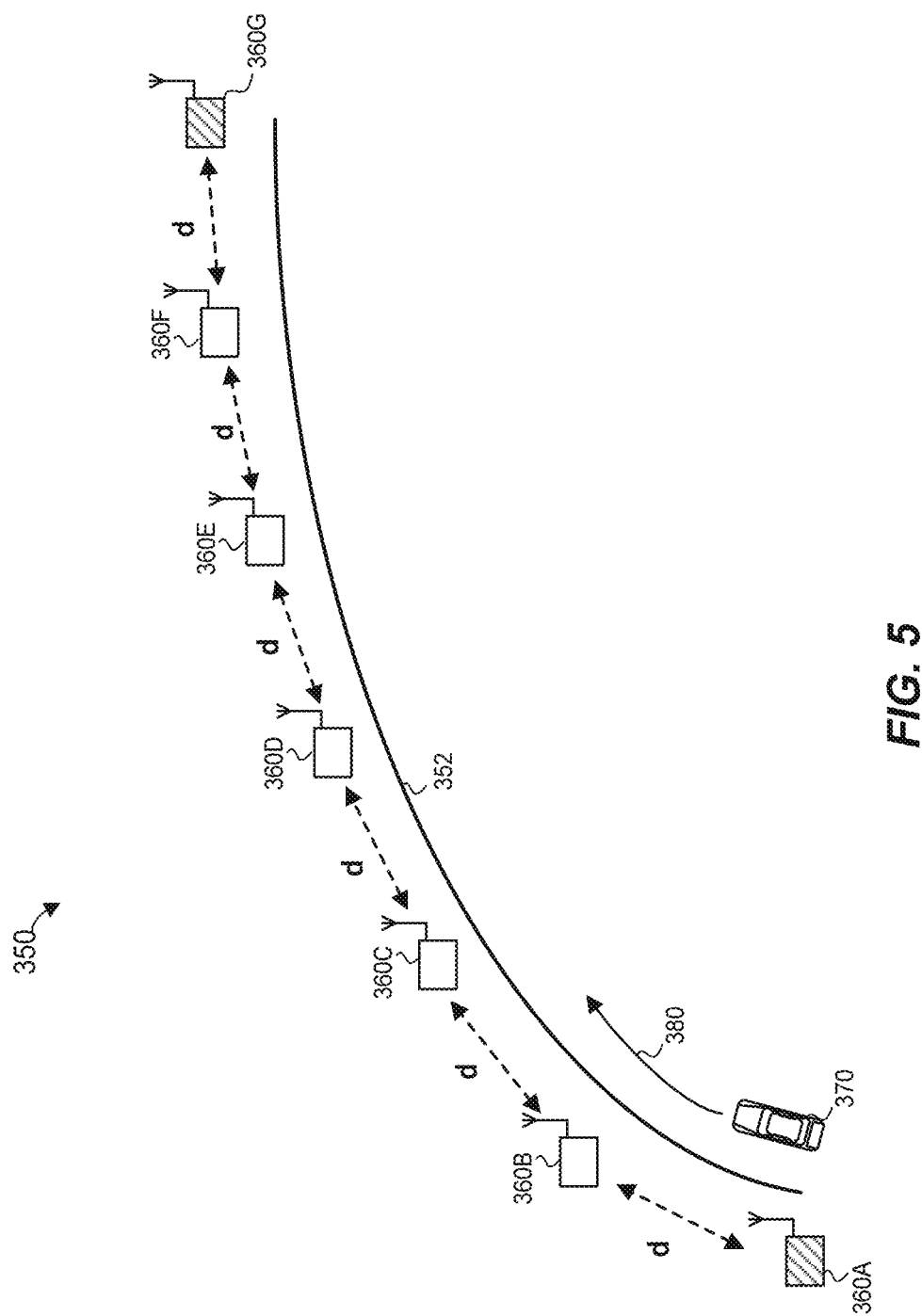
FIG. 5 is a diagram that schematically illustrates signal sources statically arranged along a path that traverses an area with limited satellite coverage, the locations of which the system of FIG. 2 can automatically determine.

The diagram 350 of FIG. 5 schematically illustrates several signal sources 360A-G statically arranged along a path 352, which can be a road through a tunnel or another area with limited satellite coverage, such as a lower-level road occluded from satellites by another level of the road. The signal sources 360A-G may be arranged at least approximately at distance d from each other, with the separation between pairs of adjacent signal sources varying depending on the particular setup. In those configurations where the separation between some of the adjacent signal sources significantly deviates from distance d, the signal source configuration system 140 can use certain techniques to determine distances d', d", etc., as discussed below.

As a more specific example, a technician can affix proximity beacons to the ceiling of the tunnel, trying to maintain the separation of distance d between the beacons. When the technician is known to use relatively precise spacing techniques, the signal source configuration system 140 can be configured to implement the assumption that each pair of adjacent signal sources 360A-G is separated by distance d. Moreover, the signal source configuration system 140 can be configured to implement this assumption only for the purposes of generating an initial estimate of where along the path 352 the signal sources 360A-G are located. The signal source configuration system 140 then can adjust the initial estimate once additional or improved data becomes available.

In any case, the signal source configuration system 140 initially may not have any information about the location of the signal sources 360B-360F. Regarding the signal sources 360A and 360G disposed at the respective ends of the path 352, these devices in some scenarios may be disposed near the two entrances into the tunnel. In these cases, the location of the signal sources 360A and 360G may be determined relatively easily using respective GPS positioning fixes, for example.

A vehicle 370 can be similar to the vehicle 12 of FIG. 1 include a receiver such as the station 22, for example. The receiver in general can be any suitable device capable of detecting, measuring the strength of, and at least partially processing wireless signals from the signal sources 360A-G. The vehicle 370 in the example scenario illustrated in FIG. 5 moves along the path 352 in the direction 380, and the receiver of the vehicle 370 collects signal data that indicates variations in the strength of the corresponding signals from the signal sources 360A-G, as a function of time. The receiver then may provide the signal data to the signal source configuration system 140, which in turn may use this signal data to first determine the relative order of the signal sources 360A-G.

Figure 6:
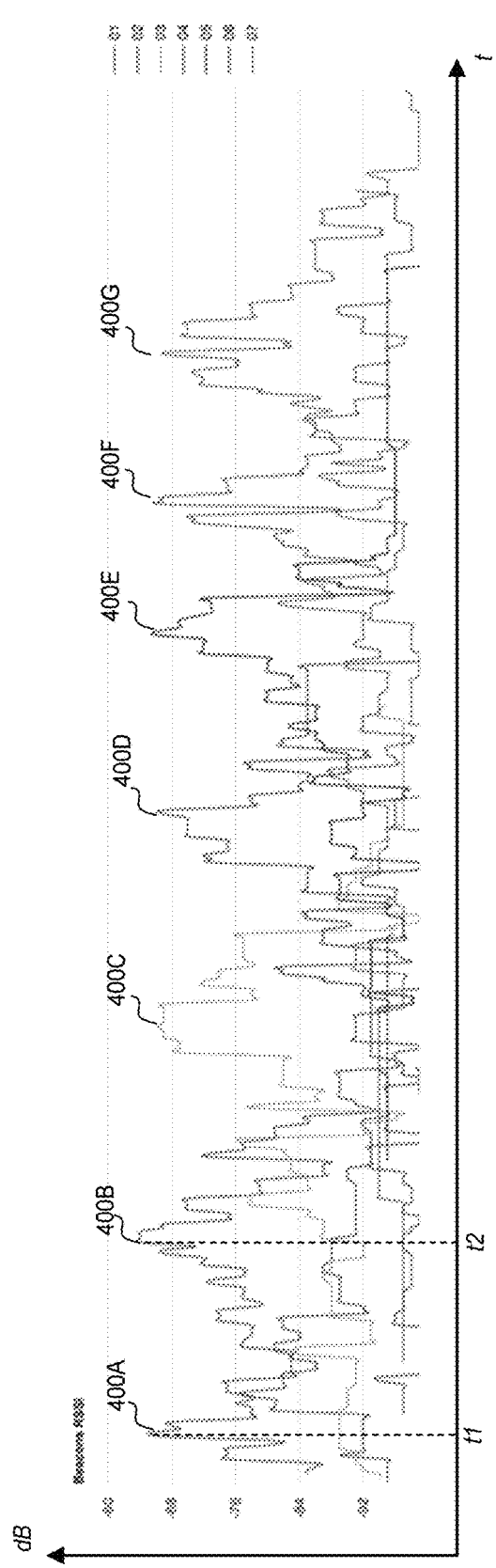
FIG. 6 is a graph of signal strength as a function of time, as measured by a receiver moving past statically arranged signal sources, such as those illustrated in FIG. 5.

As a more specific example, FIG. 6 illustrates signal data which the receiver in the vehicle 370 may collect while traveling along the path 352 in the direction 380. Each of the seven illustrated signals can include an identifier of the corresponding signal source in the form of any suitable combination of numbers and/or characters. Peaks 400A-G correspond to the maximum strength (e.g., RSSI) the signals from different signal sources reach at the corresponding times. For example, the peak 400A occurs at time $t_1$, when the receiver mounted in the vehicle 370 detects the strongest signal from the source signal 360A, which typically occurs when the vehicle 370 is in closest proximity to the signal source 360A (except for the situations discussed with reference to FIG. 7). At this time, the signals from the other signal sources 360B-G are weak or not practically detectable at all.

At time $t_2$, the receiver mounted in the vehicle 370 detects the strongest signal from the source signal 360B (peak 400B), while the signal from the source signal 360A drops by about 20 dB. At this time, the vehicle 370 is likely in close proximity to the signal source 360B. A similar pattern can be observed for the other signals: the receiver observes a peak value of signal strength for one of the signal sources and low signal strength for the remaining signal sources. Before the receiver reaches a certain signal source, the signal strength for the signal source gradually increases but not necessarily in a "smooth" manner due to various obstacles, interference, multipath, etc. Similarly, after the receiver passes the signal source, the signal strength gradually drops off.

The order in which the signal source configuration system 140 observes peak signal values typically corresponds to the order in which the vehicle 370 passes the corresponding signal sources. Thus, the signal source configuration system 140 can determine based on the signal data illustrated in FIG. 6 that the peaks occur in the following order: 400A, 400B, . . . 400G, that the corresponding signals identify signal sources 360A, 360B, . . . 360G, and thus the signal sources are arranged as the sequence 360A, 360B, . . . 360G along the path 352 in the direction 380.

According to one implementation, the signal source configuration system 140 further estimates the average distance between the signal sources 360A-G using the determined order and by dividing the distance L along the path 352 by the number of intervals between the N signal sources: $d=L/(N-1)$. The signal source configuration system 140 can obtain the distance L using Geographic Information System (GIS) data, map data that describes natural and artificial geographic features provided a mapping service such as Google Maps, for example, or other suitable geospatial data. Alternatively, the signal source configuration system 140 may obtain positioning fixes such as GPS signals from the signal sources 360A and 360G, which are positioned outside the area of limited satellite coverage, and estimate the distance L using the two positioning fixes, particularly when the path 352 has low curvature. The signal source configuration system 140 then can determine the respective locations of these signal sources, using the known location of the signal source 360A or 360G and/or some other indication of geometry of the path 352. More specifically, the signal source configuration system 140 can calculate the location of the signal source 360B by applying a displacement vector of length d to the known location of the signal source 360A, calculate the location of the signal source 360C by applying a displacement vector of length d to the known location of the signal source 360B, etc.

As indicated above, not every pair of adjacent signal sources 360A-G may be separated by the same distance d, but the signal source configuration system 140 may implement this assumption to generate an initial positioning estimate or when it is known that a constant separation has been maintained during installation of the signal sources 360A-G.

Figure 7:
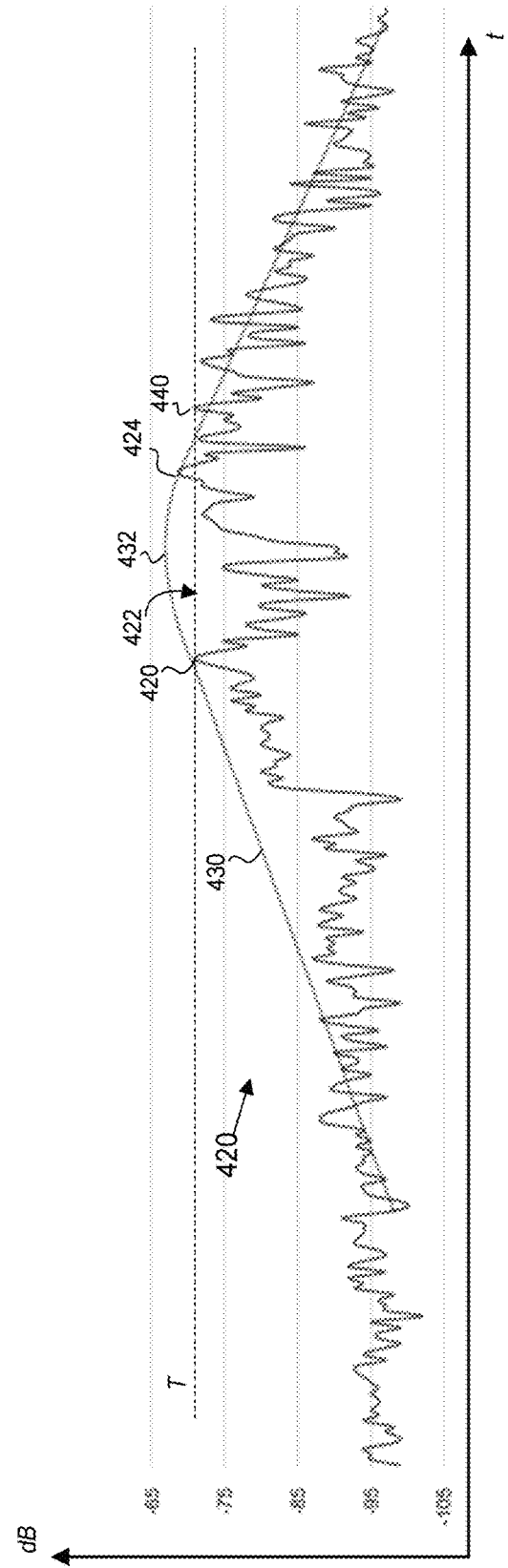
FIG. 7 schematically illustrates extrapolation of signal data to automatically determine a time when a signal source likely was obscured by the roof of the vehicle in which the receiver was travelling, which can be implemented in the system of FIG. 2.

Now referring to FIG. 7, the signal from a signal source 360A-G in some cases may be temporarily obscured by the metal roof of the vehicle in which the receiver is disposed. The attenuation can be particularly significant for certain frequencies of the signal. Example signal data 420 corresponds to one of the signal sources 360A-G. Similar to the signal data of FIG. 6, the strength of the signal generally increases at the receiver as the vehicle approaches the signal source and generally decreases at the receiver as the vehicle moves away from the signal source. However, here the signal strength reaches a first peak 420, drops off into a "valley" 422, reaches a second peak 424, and gradually decreases to a low level. The valley 422 likely corresponds to the time when the vehicle is below the signal source mounted on the ceiling of the tunnel; the peak 420 likely corresponds to the time when the signal from the signal source passes through the windshield of the vehicle; and the peak 424 likely corresponds to the time when the signal passes through the rear window of the vehicle. The drop in signal strength in the valley 422 can be as much as 20 dB, depending on such factors as the frequency of the signal and the material in the roof of the vehicle.

The signal source configuration system 140 can automatically generate an approximation 430 for the signal data 420, with a single extrapolated peak 432 occurring approximately in the middle of the time interval between the peaks 420 and 424. To this end, the signal source configuration system 140 can use a suitable statistical technique to generate one curve for the upward trend in signal strength as the vehicle is approaching the signal source, generate another curve for the downward trend in signal strength as the vehicle moves away from the signal source, and identify the peak 432 as an intersection of the two curves, for example. In view of these trends, the signal source configuration system 140 can determine that the extrapolated peak should be between the peaks 420 and 424 rather than between the peak 424 and peak 440, for example.

Additionally or alternatively, the signal source configuration system 140 can determine whether a pair of candidate high peaks, such as the peaks 420 and 424, are separated approximately by the time it takes a length of a vehicle to pass the signal source. For example, assuming the distance between the point where the receiver in a vehicle "sees" the signal through the windshield at a certain incident angle and where the receiver again begins to see the signal through the rear window is 30 m, the peaks 420 and 424 for a vehicle travelling at 100 km/h should be separated by approximately one second. The signal source configuration system 140 accordingly can check whether the time interval between candidate peaks appears to be within a reasonable range in view of the speed of the vehicle (which in turn can be estimated based on the positioning fixes and the timestamps at the signal sources 360A and 360G).

Referring again to FIG. 6, when the receiver in the vehicle 370 obtains positioning fixes and the corresponding timestamps for the signal sources 360A and 360G, the signal source configuration system 140 can determine an average speed $v_{avg}$ of the vehicle between signal sources 360A and 360G by dividing the distance L by the difference between the two timestamps. When the signal sources 360B-F are separated unevenly rather than with the constant interval of length d, the signal source configuration system 140 can determine the locations of the signal sources by multiplying the previously determined average speed $v_{avg}$ by the amount of time it takes to reach a certain peak, and calculating the distance (or, more generally, a displacement vector) relative to a known location, such as the entrance into the tunnel.

Figure 8:
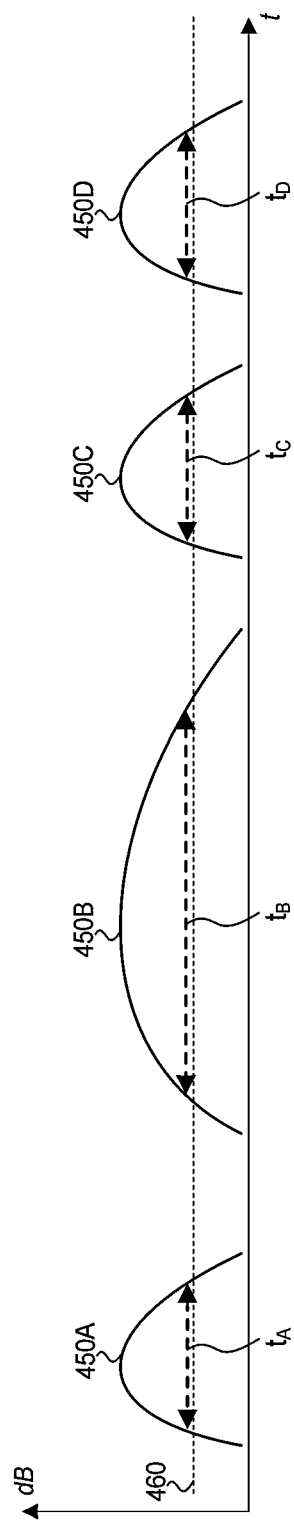
FIG. 8 is a simplified diagram of changes in signal strength over time as measured by a vehicle moving past signal sources at different speeds.

The signal source configuration system 140 in some implementations also can account for variations in speed of the vehicle moving along the path 352. Some tunnels are sufficiently long to generate significant variations in the speed of the vehicle, and traffic or differences in road quality can result in even greater variations in speed. FIG. 8 illustrates highly simplified signal data that a receiver in a vehicle can collect for the signal sources 360A, 360B, 360C and 360D, for example. In this scenario, the receiver sees the signal 450A, from the signal source 360A, above a threshold level 460 for a certain amount of time $t_4$. The threshold level 460 can be set experimentally, but in any case significantly above the noise level to improve accuracy. In other embodiments, the receiver does not use any particular threshold values and instead analyzes relative changes in signal strength. The receiver sees the signals 450C and 450D, from the signal sources 360C and 360D, for approximately the same amount of time. However, the receiver sees the signal 450B from the signal source 360B for a longer amount of time $t_B$. If the signal sources 360A-G are known to transmit at similar power levels, which is typical, these variations between the amount of time $t_A$ and $t_B$ are likely to due to differences in speed.

Assuming the signals 450A-D are transmitted by equally powerful transmitters, the signal source configuration system 140 can interpret the signal data illustrated in FIG. 8 as indicating speeds $v_A$–$v_D$ for different sections of the path 352, where $v_A$ is the speed at which the receiver moves during the time $t_A$, $v_B$ is the speed at which the receiver moves during the time $t_A$, etc. In this case, $v_A \approx v_C \approx v_D$, and $v_A/v_B \approx t_B/t_A$. It is noted that these estimates do not depend on the actual positioning of the signal sources relative to each other, and only on the duration of the exposure to signal of a certain strength. Once the respective speed values $v_A$-$v_D$ have been determined, the signal source configuration system 140 can improve the estimate of the locations of the signal sources.

Figure 9:
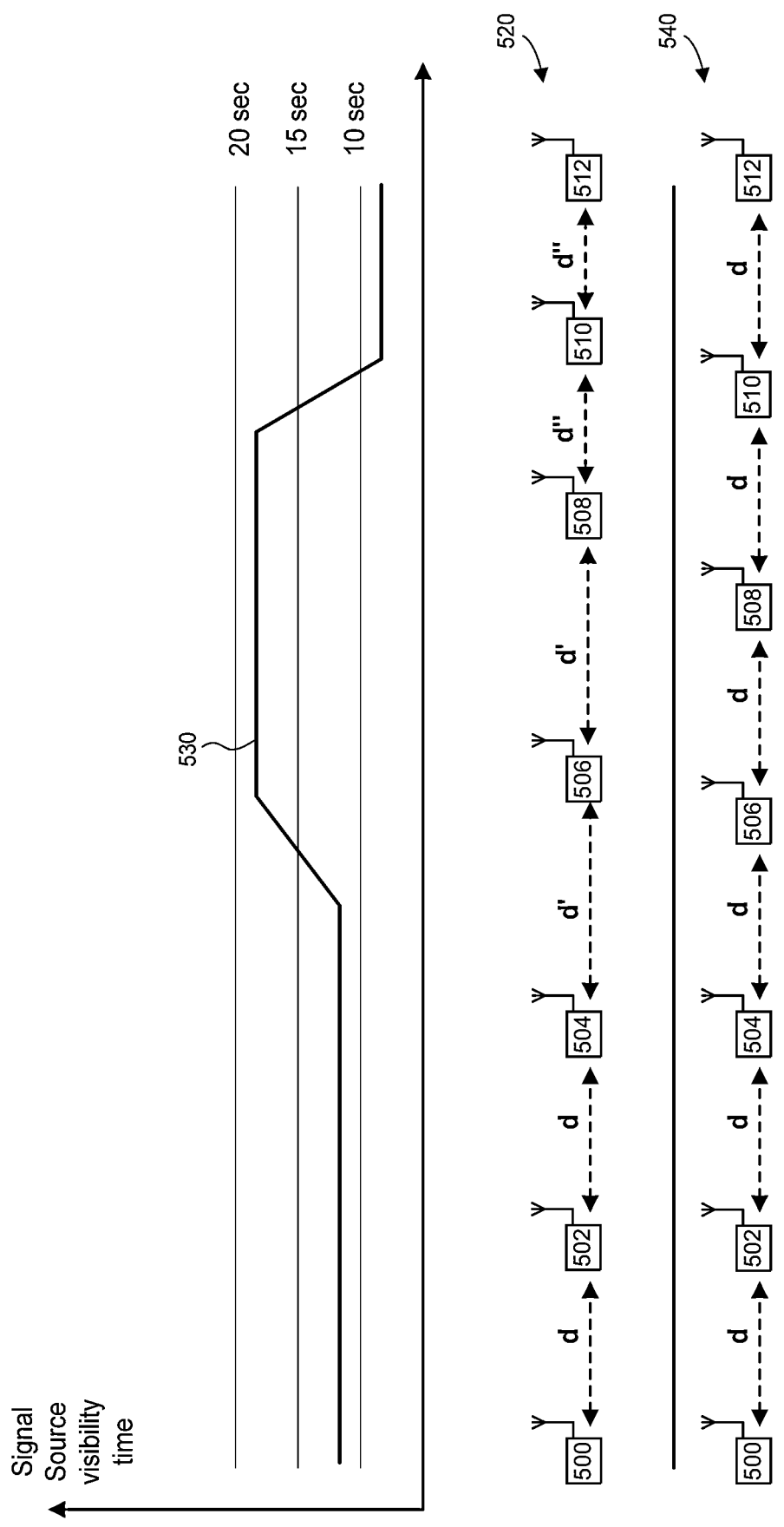
FIG. 9 schematically illustrates automatic correction of estimates of signal source location in view of vehicle speed, which can be implemented in the system of FIG. 2.

For further clarity, FIG. 9 schematically illustrates how the signal source configuration system 140 can automatically correct the estimates of signal source locations in view of varying vehicle speed. According to an initial estimation 520, which may be generated using the techniques discussed with reference to FIGS. 6 and 7 and the average speed of the vehicle, the pairs of signal sources 500/502 and 502/504 are separated by distance d, the pairs of signal sources 504/506 and 506/508 are separated by a longer distance d', and the pairs of signal sources 508/510 and 510/512 are separated by a shorter distance d". The signal source configuration system 140 in this scenario takes into account the amount of time during which the receiver in the vehicle detects a signal from a certain signal source at a strength above a certain threshold value. Plot 530 illustrates the duration of exposure, in seconds, of the receiver to a signal source as a function of time.

According to the plot 530, the receiver measures a sufficiently high strength of the signal from the signal sources 500-504 for approximately 12 seconds, from the signal sources 506 and 508 for approximately 18 seconds, and from the signal sources 510 and 512 for approximately 8 seconds. If the signal sources transmit at approximately the same power level, the plot 530 indicates that the vehicle slowed down near the signal sources 506 and 508 and sped up near the signal sources 510 and 512. Accordingly, instead of calculating a single average speed for the entire path between the signal sources 500 and 512, the signal source configuration system 140 can determine segment-specific average speed values $v_1$ for the segment corresponding to the signal sources 500-504, $v_2$ for the segment corresponding to the signal sources 506 and 508, and $v_3$ for the segment corresponding to the signal sources 510 and 512. More particularly, using timestamp information in the signal data, the signal source configuration system 140 can determine the approximate duration of time during which the receiver was exposed to the corresponding signal sources 500-512, and, using positioning fixes, surveying data or another indication of the endpoints, determine the length L, so that $v_1 t_1 + v_2 t_2 + v_3 t_3 = L$, where t is the amount of time the receiver travels past the signal sources 500-504 at speed $v_1$, $t_2$ is the amount of time the receiver travels past the signal sources 506 and 508 at speed $v_2$, and $t_3$ is the amount of time the receiver travels past the signal sources 510 and 512 at speed $v_1$.

Upon determining the values $v_1$, $v_2$, and $v_3$, the signal source configuration system 140 can more accurately determine the locations of the signal sources. For example, the signal source configuration system 140 can calculate the location of the signal source 504 relative to a known position $P_i$ of the signal source 500 reached at time $t_i$, where the observed or extrapolated peak signal strength for the signal source 504 occurs at time $t_p$, by calculating the displacement as $d = P_i = v_1(t_p - t_i)$. In this example scenario, the signal source configuration system 140 adjusts the initial estimation 520 to generate an estimation 540, in which all pairs of adjacent signal sources 500-512 are separated by distance d. Of course, in other scenarios, the initial estimate can indicate a constant separation d, and an estimate that accounts for variations in speed indicates different separations d, d', etc.

The signal source configuration system 140 in some scenarios also can use speed and/or acceleration data reported by the vehicle in which the receiver is disposed. For example, a smartphone could access the odometer and other sensor vehicles and report the vehicle sensor data along with the signal strength measurements to the signal source configuration system 140. When this data is available, the signal source configuration system 140 can improve the accuracy of signal source estimation by incorporating additional signal data.

To improve the accuracy of locating signal sources using the techniques discussed above, the signal source configuration system 140 can utilize crowdsourcing to collect signal data from multiple receivers. The signal source configuration system 140 then can implement any suitable statistical approach to apply the techniques discussed above to the signal data. For example, the signal source configuration system 140 can combine data from multiple receivers such as by averaging the data (in a non-weighted or weighted manner), eliminating outliers, assigning different weights to the data depending on the level of reliability (e.g., receivers equipped with more robust chipsets may be more accurate when measuring signal strength), etc. Further, the signal source configuration system 140 in some cases can analyze the signal data from a certain receiver to determine whether the receiver operates in a convertible vehicle or a conventional vehicle, and extrapolate the peaks in signal strength when necessary.

Further, the signal source configuration system 140 in some implementations can be configured to also account for variations in the characteristics of signal sources. Referring for example to FIG. 9, the variations in signal source visibility in some cases may be due to some of the signal sources 500-512 at a significantly higher power or, conversely, at a significantly lower power due to hardware, battery, or other factors. Further, when the signal sourced 500-512 are beacons arranged in a tunnel, the physical configuration of the tunnel can create variations in how well the signal reaches certain areas. The signal source configuration system 140 can collect signal data from multiple receivers over time to create "profiles" for the individual signal sources, and use these profiles to further correct the estimates of the positions of the signal sources.

To generate the profiles, signal data for multiple receivers and multiple signal sources can be organized into a two-dimensional matrix, with columns corresponding to signal sources and rows corresponding to receivers, for example. The signal source configuration system 140 can process column data to determine the properties of particular signal sources and generate appropriate weights when positioning the signal sources and/or when subsequently positioning receivers. As a more specific example, the signal sources 500-512 may be implemented as beacons that transmit indication of transmit power in the management frames. The signal source configuration system 140 can use the transmit power indications to calculate correction factors for positioning, as one may expect beacons transmitting at lower power to be "heard" for a shorter period. It has been observed that a 6 dB increase in transmit power typically results in twice the coverage (e.g., as defined by an area in which the signal can be received at above a certain fixed threshold RSSI value), and according in twice the amount of time when the beacon is heard.

Further regarding profiling, the characteristics of a certain signal source can change over time due to obstruction or battery drain, for example, and the corresponding profile may indicate how the signal source appears to operate at a particular time. The profile thus may indicate that signals from a certain source are weakened due to a possible obstructions, so that receivers can adjust the calculations accordingly. More generally, the signal source configuration system 140 can determine one or multiple characteristics of a signal source to enable adjustments during geopositioning.

Although the examples above were discussed with specific reference to the signal sources 500-512 of FIG. 9 or 360A-G of FIG. 5, it will be understood that in general each of these techniques can apply to various suitable signal sources, which may include the example signal sources of FIG. 1, 5, or 9.

Figure 10:
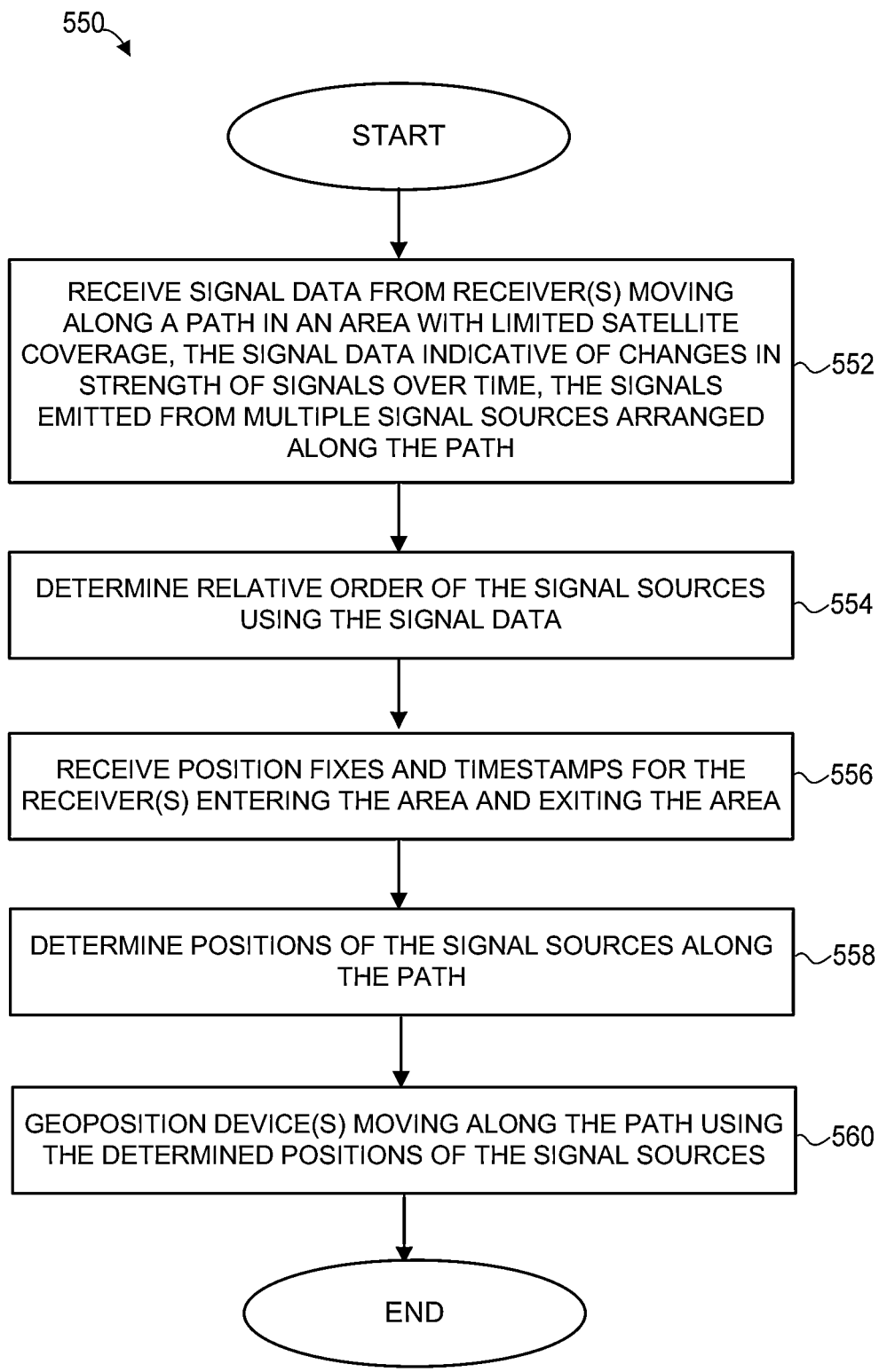
FIG. 10 is a flow diagram of an example method for determining geographic positions of signal sources in areas with limited satellite coverage, which can be implemented in the system of FIG. 2.

Now referring to FIG. 10, an example method 550 for determining geographic positions of signal sources in areas with limited satellite coverage can be implemented in the signal source configuration system 140 or another suitable system. The method 550 can be implemented as a set of instructions in any one or several suitable programming languages, stored on a non-transitory computer-readable medium and executable by one or more processors.

The method 550 begins at block 552, where signal data is obtained from one or more receivers moving along a path in an area with limited satellite coverage, e.g., on a road through a tunnel. The signal data can be indicative to changes in signal strength over time, as discussed above, and in some implementations can include such information as signal source identifiers and transmit power setting at the signal source. Moreover, in some implementations, once the locations of signal sources have been determined, the positioning information can be transmitted to the corresponding signal sources for subsequent transmission.

Next, the relative order of signal sources arranged along path is determined using the signal data at block 554. To this end, peak values for different signal sources can be identified, where the relative timing of the peaks corresponds to the order in which the receiver approaches the signal sources, as discussed above with reference to FIGS. 6-8. At block 556, positioning fixes and timestamps for the endpoints of the path can be received. Signal sources positioned at entrances to the tunnels can be manually provisioned with a GPS positioner, or can be placed at known surveyed locations, or can obtain GPS positioning fixes in real time, for example.

At block 558, the determined relative order of the signal sources can be used for approximate positioning, permanently or temporarily while additional information is collected. For example, if the assumption that the signal sources are spaced apart at regular intervals is implemented, the approximate locations of the signal sources can be determined using the locations of the endpoints to determine the distance between the endpoints and dividing the distance by the number of intermediate signal sources to obtain a displacement relative to known locations. The estimates of the locations of the signal sources can be further improved using vehicle speed, profiling of individual signal sources, and other techniques discussed above.

At block 560, the determined locations of the signal sources can be used to geoposition a receiver subsequently moving along the same path past the signal sources. Continuous improvement of the estimation of signal source locations also can occur in parallel with positioning of receivers using the currently available estimates. For example, a vehicle moving through a tunnel can request positioning using the available beacons while also contributing its signal strength measurements to the set of signal data used in signal source location determination.

Automatic Provisioning of Access Points Using RTT Measurements

Figure 11:
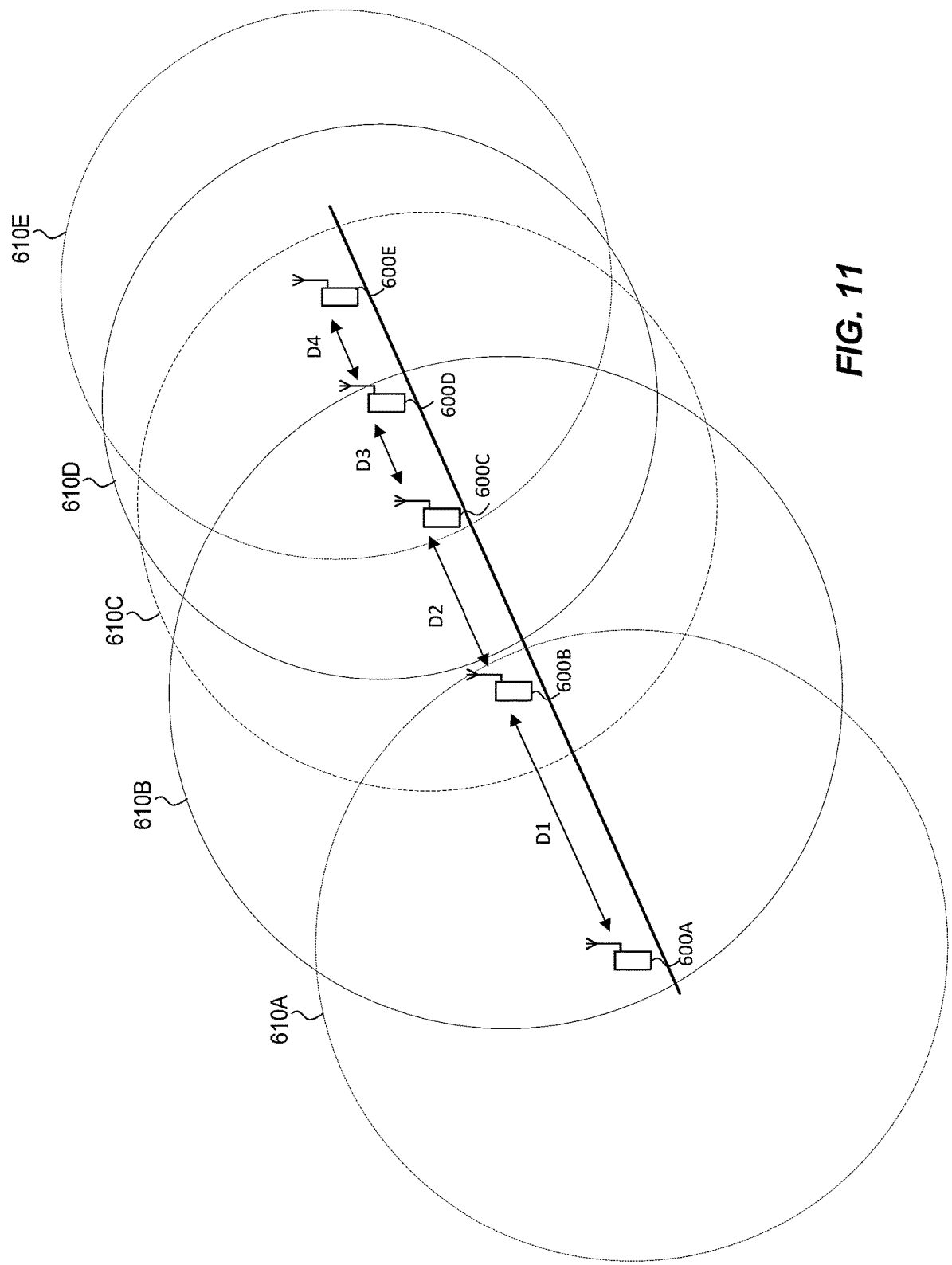
FIG. 11 is a diagram that schematically illustrates automatic determination of signal source locations using RTT measurements, which can be implemented in the system of FIG. 2.

Now referring to FIGS. 11, example stations 600A-E operate as both transmitters and receivers and are configured to automatically determine their locations using round trip-time (RTT) measurements. These stations exchange management frames such as beacon frames, for example, and measure RTT to determine distances $d_1$-$d_4$. As an alternative to RTT measurements, the stations 600A-E can use other suitable metrics using which the distance between a pair of stations can be determined. For example, the stations 600A-E can use known transmit power, RSSI measurements, and models that predict the loss in RSSI over distance to estimate distances to other stations.

The corresponding ranges of the signals transmitted by the stations 600A-E are schematically represented by circles 610A-E. The radii of the circles 610A-E typically are similar, but need not be the same for the purposes of the techniques of this disclosure. As illustrated in FIG. 11, the station 600A can "hear" the station 600B, the station 600B can hear the stations 600A and 600C, the station 600C can hear the stations 600B, 600D, and 600E, the station 600D can hear the stations 600B, 600C, and 600E, and the station 600E can hear the stations 600C and 600D. The stations 600A-E can use the one, two, or more signals from the other stations to estimate the distance to one or more neighboring stations. Moreover, when the arrangement of the stations 600A-E along the path can be described using one-dimensional geometry (i.e., at different positions at substantially the same distance from the path, such as on the ceiling of a tunnel), the stations 600A-E also can use the indication of geometry to determine their positions.

In other embodiments, the arrangement of the stations 600A-E can be described using two-dimensional or three-dimensional geometry. For example, a station can determine both the position along a line, a curve, a polyline, etc. on a plane representing a road and the height at which this or another station is disposed. Moreover, the stations 600A-E may not be arranged along a road with known geometry when used in a parking garage, a mall, or another area in which receivers can move in numerous directions. The station in these cases may use more signals from the other stations, when available, to determine positions.

Figure 12:
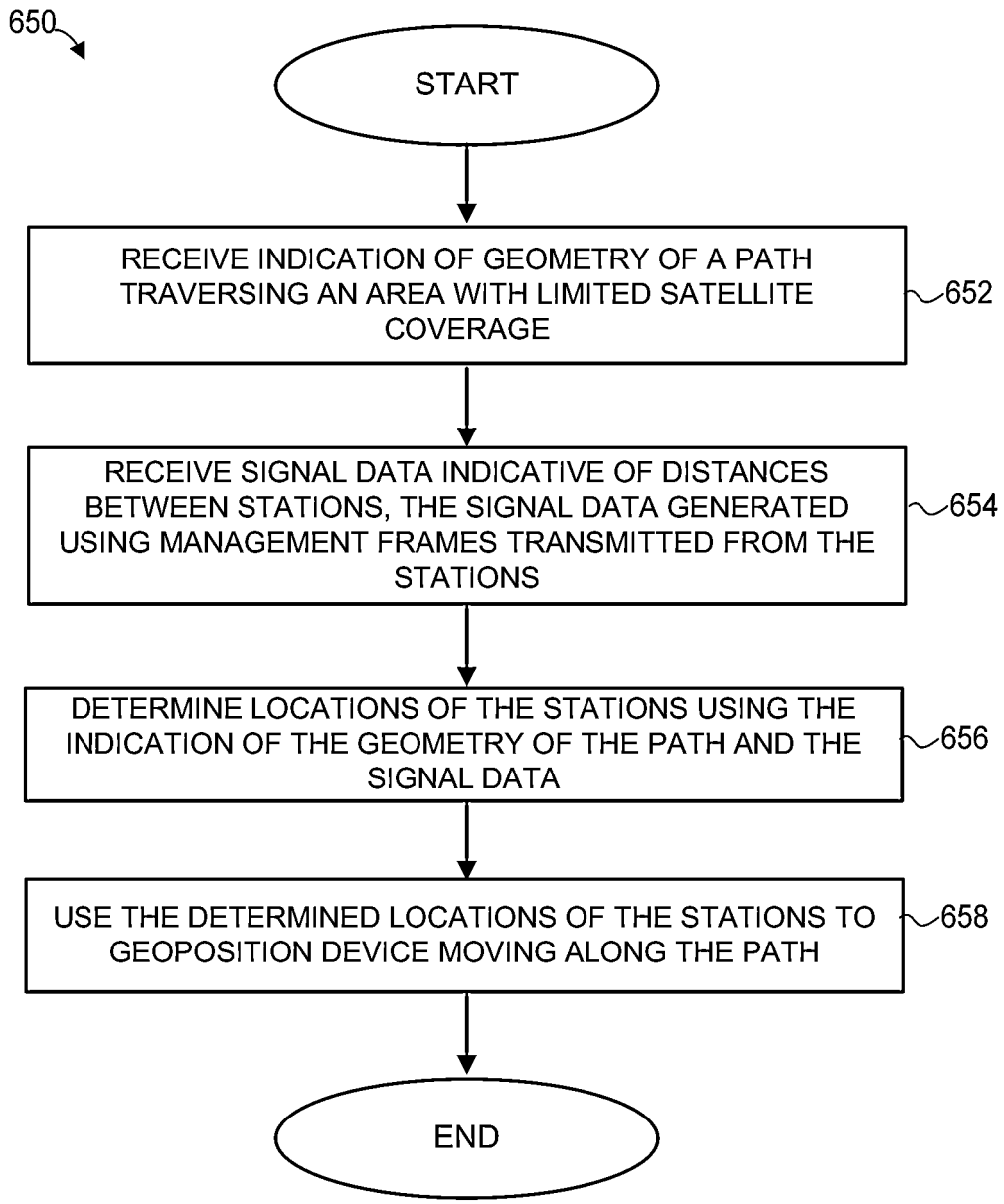
FIG. 12 is a flow diagram for provisioning of the access points that can operate in the system of FIG. 2.

For clarity, FIG. 12 illustrates a flow diagram of an example method 650 for provisioning the stations 600A-E or other signal sources capable of also receiving wireless signals. The method 650 can be implemented in the station 600A-E as a set of instructions stored on a non-transitory computer-readable medium, such as flash memory, of the station, and executed by one or more processors of the station. In some alternative implementations, the method 650 at least partially is implemented in a network device or system such as the signal source configuration system 140.

The method 650 begins at block 652, where an indication of geometry of a path traversing an area with limited satellite coverage is received. The geometry can be simple (e.g., a straight line, an arc) or relatively complex (e.g., a polyline). As discussed above, the path typically is a road through a tunnel. However, the method 650 also can be used with areas in which there is a large number of possible paths a receiver can traverse, and where the receiver has more degrees of freedom that a vehicle moving along a road, for example. Examples of such areas include parking garages and shopping malls. The description of geometry in these cases can be a polygon enclosing an area or even a set of vertices describing a three-dimensional volume.

At block 654, signal data indicative of distances between the stations is received. The signal data can be generated using management frames of any suitable type which the stations can receive from each other. The frames may include identifiers of the corresponding stations.

The locations of the stations then are determined using the indication of the geometry and the signal data, at block 656. Referring back to FIG. 11, the station 600A can determine the distance to the station 600B using the signal from the station 600, and the station 600B can determine the distance to the station 600A using a signal from the station 600A and determine the distance to the station 600C using a signal from the station 600C. When additional information is available, such as the signals from both the station 600D and 600E at the station 600C, the data can be averaged to arrive at a more accurate estimate. Further, similar to the examples discussed above, determining station locations can include using a known position of a station positioned at the entrance to an area with limited satellite coverage.

At block 658, the determined locations can be used to geoposition a device moving along the same path. It is noted that the techniques discussed with reference to FIGS. 10 and 11 allow the stations to determine at least positions relative to the neighboring stations without relying on a network server. Of course, the techniques discussed with reference to FIGS. 10 and 11 also can be used with a network server or a group of servers, if desired. In some embodiments, the techniques of FIGS. 10 and 11 are used with signal sources that utilize wide bandwidth to reduce multi-path problems.

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed is:

1. A method for automatically determining geographic positions of signal sources in areas with limited satellite coverage, the method comprising:
receiving, by one or more processors, signal data collected by a receiver moving along a path through a geographic area with limited satellite coverage, the signal data being indicative of changes, over a period of time, in strength of respective signals detected by the moving receiver and emitted by multiple signal sources statically disposed along the path;
determining a time it takes for a length of a vehicle to pass by the signal source at the determined speed; and
calculating, by the one or more processors, static positions of the signal sources using the signal data and the determined time, including associating the location of each signal source with a time when the signal source was directly over the roof of the vehicle in which the moving receiver is travelling.

2. The method of claim 1, wherein calculating the static positions of the signal sources includes determining, for each of the signal sources:
(i) a pair of consecutive peak values in a strength of a signal, the pair of peak values separated in time by the time it takes for a length of a vehicle to pass by the signal source at the determined speed;
(ii) an extrapolated peak occurring in the middle of the time interval between the pair of peaks, to determine a time when the signal source likely was directed over the roof of the vehicle; and
calculating, by the one or more processors, the static positions of the signal sources using the determined times corresponding to the extrapolated peaks.

3. The method of claim 2, wherein determining the pair of consecutive peaks includes:
determining that a first peak of the pair of peaks corresponds to a time when the signal from the signal source passes through a windshield of the vehicle; and
determining that a second peak of the pair of peaks corresponds to a time when the signal passes through a rear window of the vehicle.

4. The method of claim 2, wherein determining the extrapolated peak includes:

generating a first curve for an upward trend in the strength of the signal as the vehicle is approaching the signal source, generating a second curve for a downward trend in the strength of the signal as the vehicle moves away from the signal source, and determining that the extrapolated peak is at an intersection of the two first curve and the second curve.

5. The method of claim 2, further comprising:

determining whether the pair of consecutive peak values are separated by an approximate length of the vehicle.

6. A system for geopositioning receivers in areas with areas with limited satellite coverage, the system comprising:

one or more processors;

a non-transitory computer-readable memory coupled to the one or more processors and storing thereon instructions that, when executed by the one or more processor, cause the system to:

receive signal data collected by a receiver moving along a path through a geographic area with limited satellite coverage, the signal data being indicative of changes, over a period of time, in strength of respective signals detected by the moving receiver and emitted by multiple signal sources statically disposed along the path;

determining a time it takes for a length of a vehicle to pass by the signal source at the determined speed; and calculate static positions of the signal sources using the signal data and the determined time, including associating the location of each signal source with a time when the signal source was directly over the roof of the vehicle in which the moving receiver is travelling.

7. The system of claim 6, wherein to calculate the static positions of the signal sources includes, the instructions cause the system to determine, for each of the signal sources:

(i) a pair of consecutive peak values in a strength of a signal, the pair of peak values separated in time by the time it takes for a length of a vehicle to pass by the signal source at the determined speed, and (ii) an extrapolated peak occurring in the middle of the time interval between the pair of peaks, to determine a time when the signal source likely was directed over the roof of the vehicle;

wherein the instructions further cause the system to calculate static positions of the signal sources using the determined times corresponding to the extrapolated peaks.

8. The system of claim 6, wherein to determine the pair of consecutive peaks, the instructions cause the system to:"

determine that a first peak of the pair of peaks corresponds to a time when the signal from the signal source passes through a windshield of the vehicle; and determine that a second peak of the pair of peaks corresponds to a time when the signal passes through a rear window of the vehicle.

9. The system of claim 6, wherein to determine the extrapolated peak, the instructions cause the system to:

generate a first curve for an upward trend in the strength of the signal as the vehicle is approaching the signal source, generate a second curve for a downward trend in the strength of the signal as the vehicle moves away from the signal source, and determine that the extrapolated peak is at an intersection of the two first curve and the second curve.

10. The system of claim 6, wherein the instructions further cause the system to:

determine whether the pair of consecutive peak values are separated by an approximate length of the vehicle.

\* \* \* \* \*